United States Patent
Onuki

(10) Patent No.: US 11,361,689 B2
(45) Date of Patent: Jun. 14, 2022

(54) CONTROL SYSTEM FOR ROTATING DISPLAY

(71) Applicant: LIFE IS STYLE CO., LTD, Tokyo (JP)

(72) Inventor: Makoto Onuki, Tokyo (JP)

(73) Assignee: LIFE IS STYLE CO., LTD, Tokyo (JP)

(*) Notice: Subject to any disclaimer, the term of this patent is extended or adjusted under 35 U.S.C. 154(b) by 0 days.

(21) Appl. No.: 16/758,064

(22) PCT Filed: Oct. 23, 2018

(86) PCT No.: PCT/JP2018/039291
§ 371 (c)(1),
(2) Date: Apr. 22, 2020

(87) PCT Pub. No.: WO2019/087857
PCT Pub. Date: May 9, 2019

(65) Prior Publication Data
US 2021/0192996 A1    Jun. 24, 2021

(30) Foreign Application Priority Data

Nov. 2, 2017  (JP) ............................. JP2017-213310

(51) Int. Cl.
*G09G 3/00*     (2006.01)
*G09F 9/37*     (2006.01)
*G09F 13/00*    (2006.01)
*G09F 13/30*    (2006.01)
(Continued)

(52) U.S. Cl.
CPC .............. *G09G 3/005* (2013.01); *G09F 9/37* (2013.01); *G09F 13/005* (2013.01); *G09F 13/30* (2013.01);
(Continued)

(58) Field of Classification Search
CPC .... G09G 3/005; G09G 5/00; G09G 2320/028; G09G 2354/00; G09G 2380/06;
(Continued)

(56) References Cited

U.S. PATENT DOCUMENTS

2004/0102223 A1*  5/2004  Lo ........................ G09G 3/005
                                                   455/566
2006/0167990 A1*  7/2006  Tobiasen ................ G09F 9/33
                                                   709/204
(Continued)

FOREIGN PATENT DOCUMENTS

JP      8-179711      7/1996
JP      2001-154614   6/2001
(Continued)

OTHER PUBLICATIONS

Written Opinion issued in parent PCT/JP2018/039291, dated Apr. 12, 2018, pp. 1-5.
(Continued)

*Primary Examiner* — Sanjiv D. Patel
(74) *Attorney, Agent, or Firm* — Jeffrey S. Melcher; Melcher Patent Law PLLC

(57) ABSTRACT

[Object] Construct a system for freely changing images to be displayed or displaying images at appropriate timing
[Solution] Control system for controlling the rotating displays. light emitting elements arranged in a line on a rotating plate.
A server stores image data in a storage device and transmits the image data to the rotating displays. The storage device stores user data. user data includes a type of each rotating display held by the user. The user data includes a time schedule for displaying the image data. The server supplies to the terminal device an operation screen for user interface. User interface allows to select the image data and a time schedule for displaying the image data, or allows the user to create displayable image data. The server has a display controller that transmit to the rotating displays the image data, that selected or created by the user and transmit the data indicating the time schedule.

18 Claims, 10 Drawing Sheets

(51) Int. Cl.
  *G09F 19/12* (2006.01)
  *G09G 3/32* (2016.01)
(52) U.S. Cl.
  CPC ............... *G09F 19/12* (2013.01); *G09G 3/32* (2013.01); *G09G 2300/04* (2013.01); *G09G 2354/00* (2013.01); *G09G 2360/18* (2013.01); *G09G 2370/02* (2013.01)
(58) Field of Classification Search
  CPC .................. G09G 2380/10; G09G 5/38; G09G 2320/068; G07F 17/3211; G06F 1/1601; G06F 2200/1637; G06F 3/147; G06F 3/1446; G06F 2200/1612; G06F 3/005; F16M 11/18; G02B 7/1827
  See application file for complete search history.

(56) References Cited

U.S. PATENT DOCUMENTS

| | | | |
|---|---|---|---|
| 2007/0103545 A1 | 5/2007 | Listig et al. | |
| 2009/0002270 A1* | 1/2009 | Chui | G09F 9/33 345/31 |
| 2011/0164070 A1 | 7/2011 | Sirmon et al. | |
| 2014/0067549 A1* | 3/2014 | Park | G06Q 30/0241 705/14.68 |
| 2016/0148548 A1* | 5/2016 | Pudipeddi | G09G 3/005 345/31 |
| 2017/0223344 A1* | 8/2017 | Kaehler | H04N 13/393 |

FOREIGN PATENT DOCUMENTS

| | | |
|---|---|---|
| JP | 2016-143297 | 8/2016 |
| KR | 10-2016-122324 | 10/2016 |
| WO | 2015/140578 | 9/2015 |

OTHER PUBLICATIONS

International Search Report issued in parent PCT/JP2018/039291, dated Apr. 12, 2018, pp. 1-2.

* cited by examiner

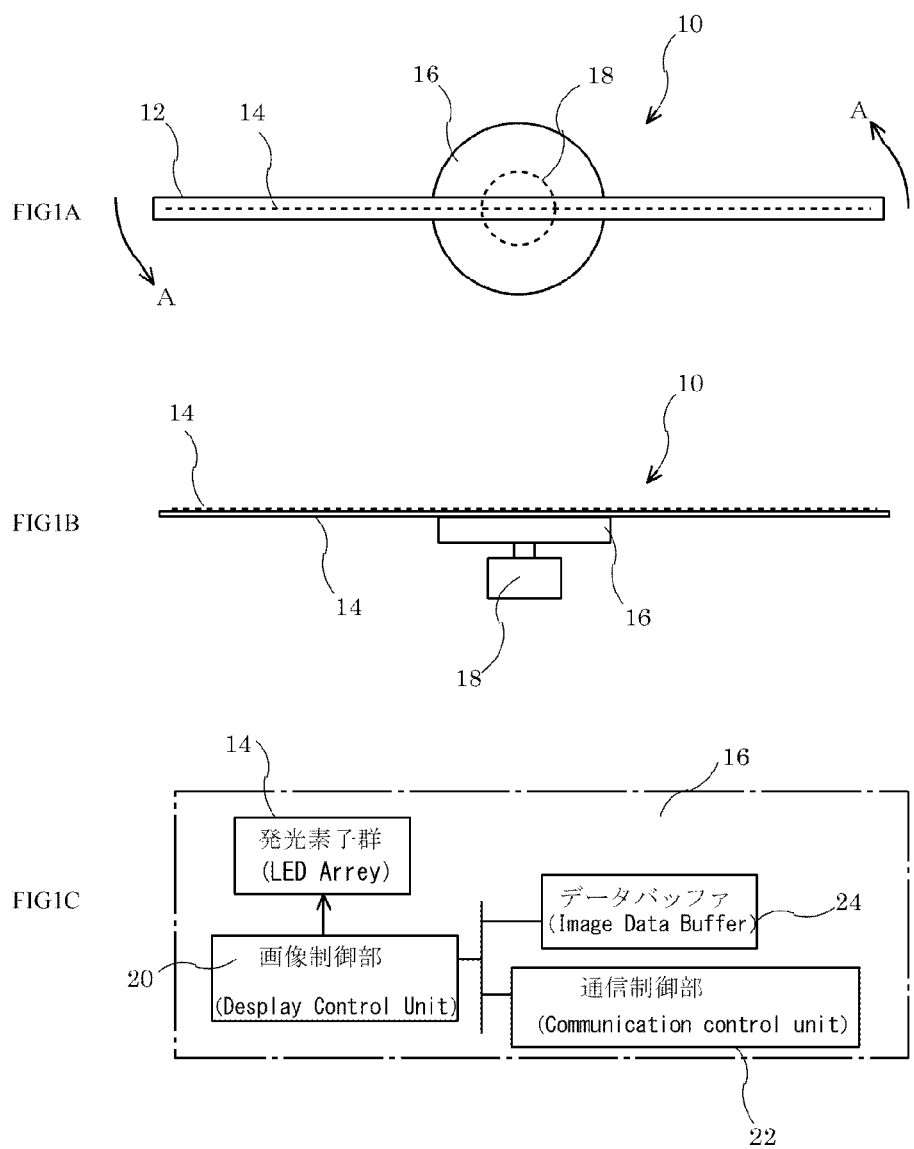

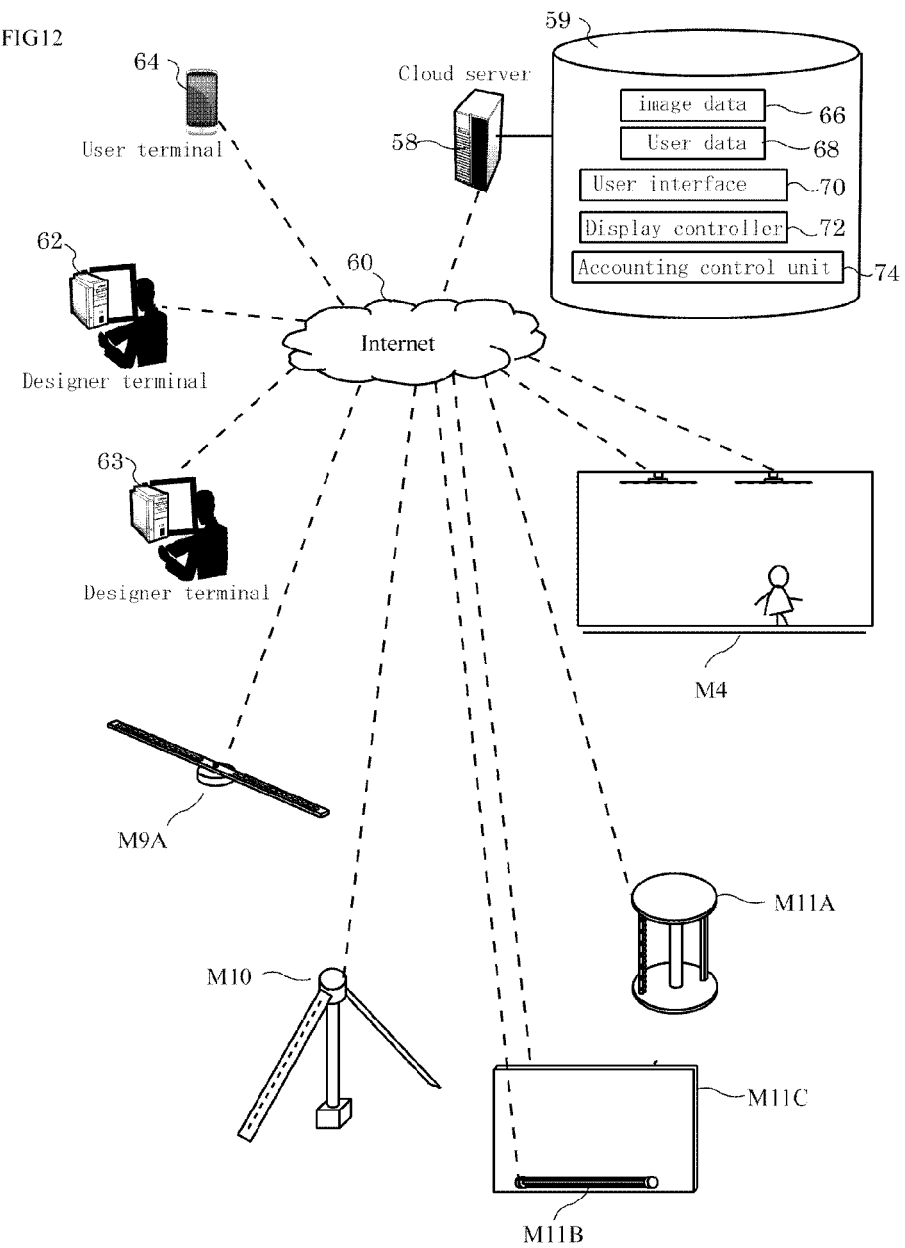

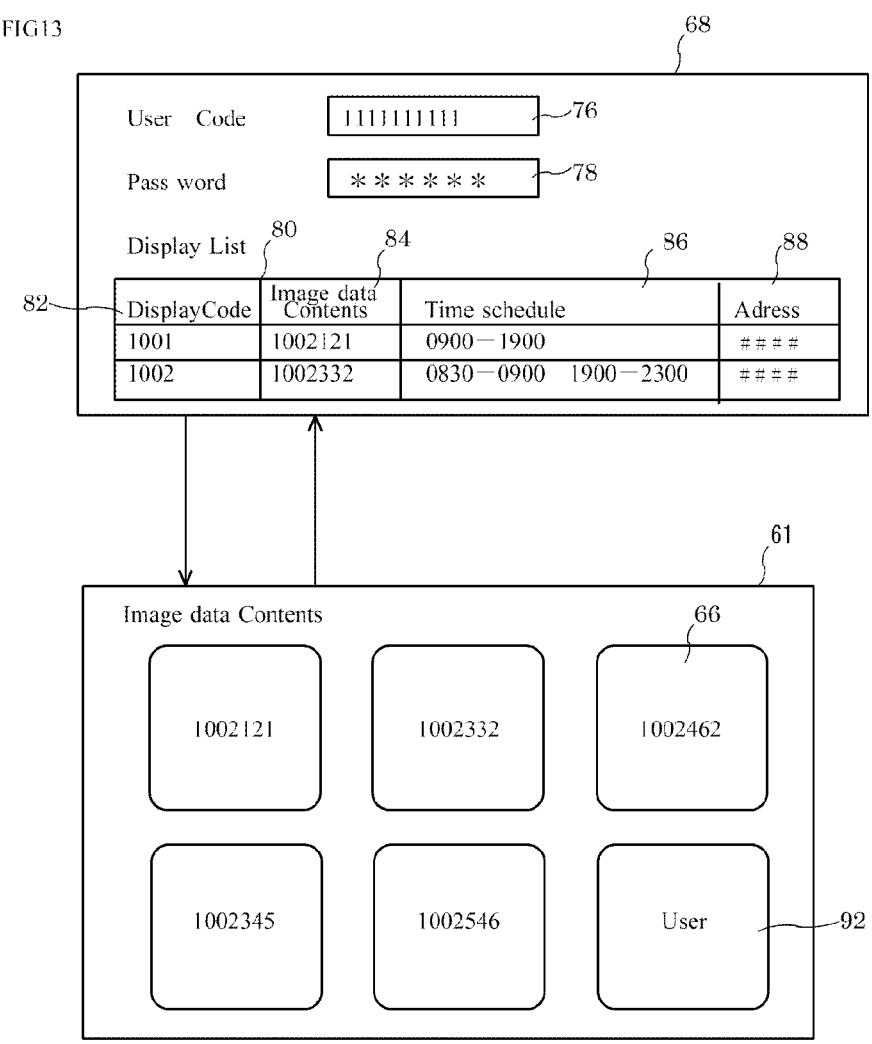

CONTROL SYSTEM FOR ROTATING DISPLAY

FIELD OF THE INVENTION

The present invention relates to a control system for rotating display. The rotating display displays images using light-emitting elements arranged in a line on a plate that is driven to rotate.

BACKGROUND OF THE INVENTION

Patent Document 1 (WO/2015/140578) discloses a technique of a rotating display that displays an image by light emitting elements. The elements are arranged in a line on a belt-shaped plate that is driven to rotate.

This display is different from a general display having a frame. It does not display an image in a portion surrounded by the frame.

When the light emitting elements arranged in a line is rotated, an image created by the afterimage is displayed. Since the image appears to float in the air. It is possible to display a moving image or a stereoscopic image as if it were a real object.

PRIOR ART DOCUMENT

Patent Document

[Patent Document 1] WO/2015/140578

SUMMARY OF THE INVENTION

Problem to be Resolved by the Invention

The prior art has the problems to be improved. Rotating displays are effective when installed in stores and used for advertising. It is desired to improve the structure to further enhance its effect. It is desired to construct a system for freely changing images to be displayed or displaying images at appropriate timing. In addition, rotating displays can cause the rotating parts to hurt a person. A structure with safety cover is desired. However, a cover reduces the visual effect. The object of this invention is to solve the problems.

Means of Solving of the Problems

The following configurations are structures for solving the above problems.

<Configuration 1>

Control system for controlling the rotating displays that display an image data by a rotating plate, on which light emitting elements arranged in a line, wherein;

a server connects with plurality of rotating displays via a network;

the server stores image data in a storage device and transmits the image data to the rotating displays;

the storage device stores user data including a type of each rotating display held by the user and a time schedule for displaying the image data for the user;

the server supplies to the terminal device an operation screen for user interface, that allows to select the image data that can be displayed according to the type of the rotating display held by the user, or allows the user to create displayable image data, or allows the user to input a time schedule for displaying the image data, and the server has a display controller that transmit to the rotating displays the image data, that selected or created by the user and transmit the data indicating the time schedule.

<Configuration 2>

Control system for rotating display according to the Configuration 1, the server is connected to the terminal device held by the designer via the network, the designed image data transmitted from the terminal device held by the designer is stored in the storage device of the server, and a accounting control unit is provided that adds a reward to the designer when the user selected the designed image data.

<Configuration 3>

Control system for rotating display according to the Configuration 1, the rotating display has a data buffer that stores the image data for forming an image with an afterimage during rotation of the light-emitting elements and an image controller that supplies the image data to the light-emitting elements; wherein, two rows of light emitting elements are arranged on the plate, and when viewed from a direction intersecting this row, the two light emitting elements rows are arranged so that the other element can be seen from between the one element.

<Configuration 4>

Control system for rotating display according to the Configuration 1, the rotating display has a data buffer that stores the image data for forming an image with an afterimage during rotation of the light-emitting elements and an image controller that supplies the image data to the light-emitting elements; wherein, the plurality of rotating displays are arranged in a preset pattern, and the plurality of rotating displays are arranged so that some or all of the images displayed overlap on each rotating display.

<Configuration 5>

Control system for rotating display according to the Configuration 1, the rotating display has a data buffer that stores the image data for forming an image with an afterimage during rotation of the light-emitting elements and an image controller that supplies the image data to the light-emitting elements; wherein, one or more plates are arranged parallel to the drive shaft of the driving device and each plate rotates around the drive shaft.

<Configuration 6>

Control system for rotating display according to the Configuration 1, the rotating display has a data buffer that stores the image data for forming an image with an afterimage during rotation of the light-emitting elements and an image controller that supplies the image data to the light-emitting elements; wherein, one or more plates are arranged like an umbrella bone around a driving shaft of the driving device.

<Configuration 7>

Control system for rotating display according to the Configuration 1, the rotating display has a data buffer that stores the image data for forming an image with an afterimage during rotation of the light-emitting elements and an image controller that supplies the image data to the light-emitting elements; wherein, the plate is transparent.

<Configuration 8>

Control system for rotating display according to the Configuration 1, the rotating display has a data buffer that stores the image data for forming an image with an afterimage during rotation of the light-emitting elements and an image controller that supplies the image data to the light-emitting elements; wherein, a rotating shaft of the motor of the driving device is passed through the transparent board, the motor is arranged on one side of the transparent board, and the plate is arranged on the other side with the light emitting elements facing the motor side. <Configuration 9>

Control system for rotating display according to the Configuration 1, the rotating display has a data buffer that stores the image data for forming an image with an afterimage during rotation of the light-emitting elements and an image controller that supplies the image data to the light-emitting elements; wherein, the rotating plate of the rotating display is surrounded with a transparent hemispherical protective cover.
<Configuration 10>

Control system for rotating display according to the Configuration 1, the rotating display has a data buffer that stores the image data for forming an image with an afterimage during rotation of the light-emitting elements and an image controller that supplies the image data to the light-emitting elements; wherein, the driving device has no protective cover, and has a human sensor that detects when a person approaches, and an alarm that emits an alarm sound by this detection or a switch that shuts off the power supply of the driving device.
<Configuration 11>

Control system for rotating display according to the Configuration 1, the rotating display has a data buffer that stores the image data for forming an image with an afterimage during rotation of the light-emitting elements and an image controller that supplies the image data to the light-emitting elements; wherein, the cross section of the plate is streamlined, or the plan view of the plate is S-shape, and the plate is connected to the rotation axis as axisymmetric.

Effect of this Invention

<Effect of the Configuration 1>

Image data that can be displayed according to the type of the rotating display is presented to the user. The user can select and use desired image data from the data. The user can enter a time schedule. Since the computer automatically controls the display timing of the image data, the great effect can be exerted for advertisement and the like. Further, the user can freely increase or decrease the image data by using the user interface. The server can control various types of rotating displays installed over a wide area through a network.
<Effect of the Configuration 2>

An appropriate reward can be provided to a designer who has designed and entered image data that is popular with users.
<Effect of the Configuration 3>

When the light emitting elements is arranged in one line, an annular black streak due to an afterimage of a gap between adjacent light emitting elements may be conspicuous. This can be prevented if the arrangement of the two light emitting element arrays arranged in parallel is shifted in the longitudinal direction.

<Effect of the Configuration 4>

Displaying one moving image or three-dimensional image on each plate and linking the images on a plurality of plates allows a more effective display of an advertising tower. An image of an arbitrary shape without a seam can be displayed by partially or entirely overlapping a plurality of rotating displays.
<Effect of the Configuration 5>

It can display characters in the longitudinal direction of the plate. It can be arranged on the front of a general display to form a composite image such as subtitles.
<Effect of Configuration 6>

If the rotating drive shaft is set up perpendicular to the floor, the displayed image can be viewed from anywhere around the drive shaft.
<Effect of Configuration 7>

Since the plate and the substrate are transparent, the image formed by the afterimage appears floating in the air during the rotation of the light emitting element, and the moving image and the stereoscopic image can be felt as if they were real.
<Effect of Configuration 8>

Safety is ensured when viewed the image from one side of the transparent plate. Moreover, since the transparent plate allows the user to see the scenery behind the rotating plate, there is a visual effect that the moving image or the stereoscopic image due to the afterimage is fused with the background.
<Effect of Configuration 9>

The hemispherical protective cover prevents a person from touching the rotating plate. The hemispherical protective cover has a visual effect that the depth of the stereoscopic image due to the afterimage can be felt more deeply.
<Effect of Configuration 10>

Even if there is no protective cover, safety for the people approaching can be ensured by the detecting them.
<Effect of Configuration 11>

Wind noise caused by the rotation of the plate can be reduced.

BRIEF DESCRIPTION OF DRAWINGS

FIG. 1A is a schematic plan view of a known rotating display, FIG. 1B is a side view of it, and FIG. 1C is a block diagram of an example of a circuit mounted on a substrate of it.

FIG. 9 is a perspective view of the rotating display according to the sixth embodiment.

FIG. 12 is a block diagram of a management system of the rotating displays using the Internet.

FIG. 13 is a block diagram showing a specific example of user data and image data of the management system.

DESCRIPTION OF THE EMBODIMENT

Figure 2A:
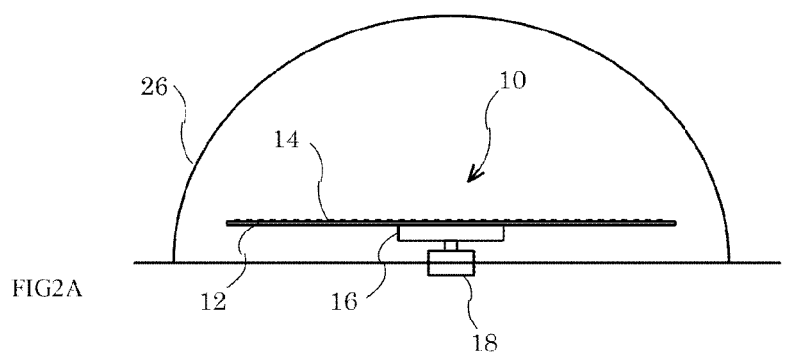
FIG. 2 is a side view of the rotating display according to the first embodiment.

Hereinafter, embodiments of the present invention will be described in detail for each example.

FIGS. 1 to 11 illustrate various types of rotating displays used in the Control system for rotating display of the present invention. Then, the entire structure of the control system for the rotating display will be described with FIG. 12.

FIG. 1A is a schematic plan view of the known rotating display (10), FIG. 1B is a side view thereof, and FIG. 1C is a block diagram of a circuit example mounted on a board (16) of the apparatus.

First, a schematic structure and operation principle of the device of Patent Document 1 will be described using FIG. 1. In this device, a light emitting elements (14) (for example, LED Array) is linearly arranged on a plate (12). These light emitting elements (14) are driven by a display control unit (20) mounted on the board (16). The plate (12) and the board (16) are integrated. Then, the plate (12) is rotated in the direction of arrow A by a driving device (18) (for example, an electric motor) having a rotating shaft fixed to the center of the board (16).

As shown in FIG. 1C, the board (16) has a display control unit (20), a data buffer (24), and a communication control unit (22) mounted thereon. The communication control unit (22) has a function of receiving image data for driving of the light emitting elements (14). This image data is transmitted from, for example, a personal computer or a server provided outside the device. The received image data is stored in the data buffer (24). The display control unit (20) reads out the image data in sequence at a predetermined timing and drives the light emitting elements (14).

The plate (12) shown in FIG. 1A is rotated at high speed in the direction of arrow A by the driving device (18). The light emitting elements (14) blinks according to the image data supplied to them. Various images are displayed by the afterimage effect of the blinking light emitting elements (14). This rotating display has no frame. The displayed image is not surrounded by frames. When the plate (12) rotates at a high speed, the plate becomes invisible, so that the image displayed by the light emitting elements (14) appears to be floating in space. This has a feature that a realistic moving image or a stereoscopic image can be displayed.

Embodiment 1

FIG. 2 is a side view showing the rotating display according to the first embodiment.

As described with reference to FIG. 1A, the image is displayed while the plate (12) is rotating, so that the moving image or the stereoscopic image appears during the rotation. The image attracts the human eyes. At that time, if the surrounding person forgets that the plate (12) is rotating, it is dangerous because the hands and face are brought too close to the plate. For example, the plate has a length of several tens of centimeters, a width of several centimeters, and a thickness of several millimeters when combined with the light emitting elements (14). When this is rotating, there is a high risk of hurting hands and fingers of the surrounding person.

Therefore, in this embodiment, as shown in FIG. 2A, a protective cover (26) is provided so as to cover the entire plate (12). This protective cover (26) is preferably made of transparent plastic, glass or the like. Further, the protective cover (26) is suitably made of a net having good light transmittance so as not to hinder the visual recognition of a moving image or a stereoscopic image. Thereby, safety can be ensured.

When a hemispherical protective cover (26) made of a transparent plastic or the like is put on, there is an effect that the depth of the stereoscopic image seen in the protective cover (26) can be felt deeply. In addition, there is an effect that an illusion that a three-dimensional object moves around in the protective cover (26) is generated. Therefore, this structure has an added inherent effect that is not merely a protective function for safety.

Figure 2B:
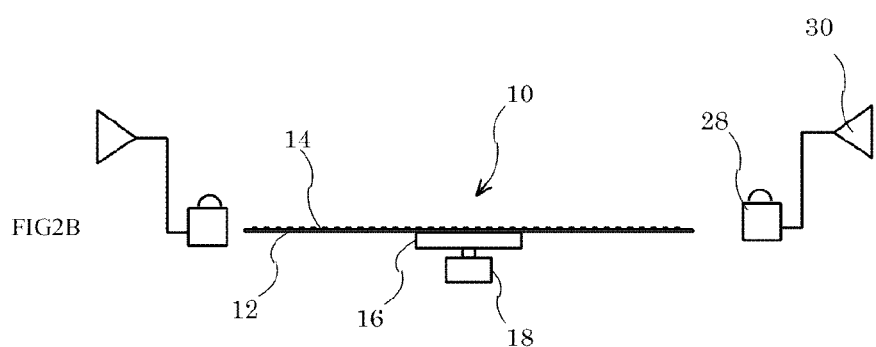
Figure 2C:
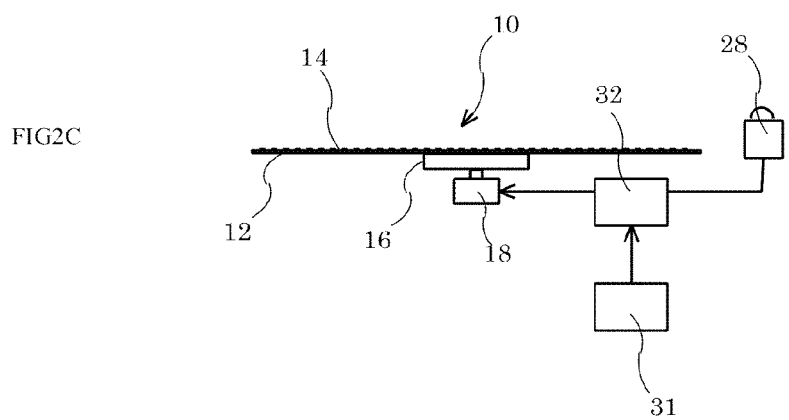

FIG. 2B and FIG. 2C are also structural examples for ensuring safety. In the example of FIG. 2B, a human sensor (28) and an alarm (30) are provided. That is, when the human sensor (28) detects a person approaching the rotating display (10), the alarm (30) emits an alarm sound. Danger can be prevented by this alarm sound. In addition, as shown in FIG. 2C, the power supplied from the power supply (31) for driving the driving device (18) can be cut off by the switch (32). When the human sensor (28) detects the approach of a person, the switch (32) operates to stop the rotation of the plate (12). Thereby, safety can be ensured. Either method is effective when the protective cover (26) is not provided.

Embodiment 2

Figure 3:
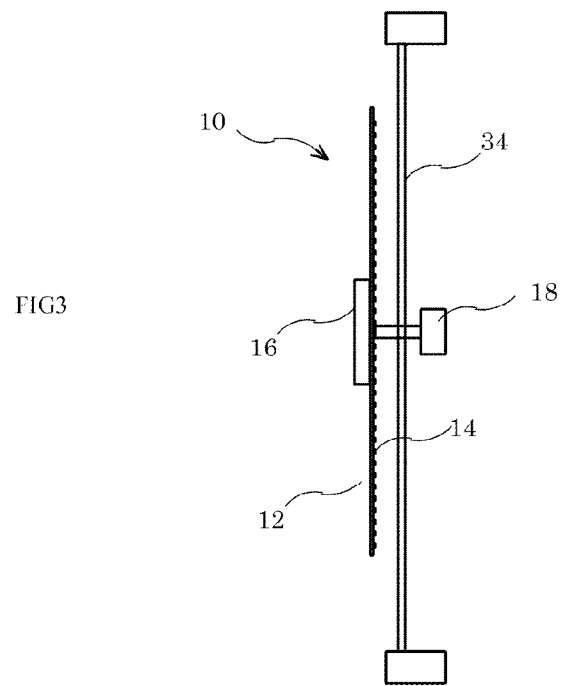
FIG. 3 is a side view of the rotating display according to the second embodiment.

FIG. 3 is a side view showing the rotating display according to the second embodiment.

This embodiment also has the effect of ensuring the safety of the viewer and increasing the visual effect of the displayed moving image or stereoscopic image. This device fixes the driving device (18) to one side of the glass window (34). The side surface of the glass window (34) to which the driving device (18) is fixed is on the indoor side. The rotation axis of the driving device (18) passes through the glass window (34). The board (16) and the plate (12) are arranged the outer side of the window. Of course, a structure that does not receive rain or the like is prepared. The board (16) and the plate (12) are rotated by a rotation shaft of a driving device (18). The light emitting elements (14) is arranged on the surface of the plate (12) facing the glass window (34).

Therefore, a moving image or a three-dimensional image can be viewed through the rotation of the light emitting elements (14) through the glass window (34) as if viewing from indoors to outdoors. Since the moving image and the three-dimensional image are viewed through the glass window (34), the image are fused with the outside scenery and the like, and an extremely effect can be achieved.

Embodiment 3

Figure 4:
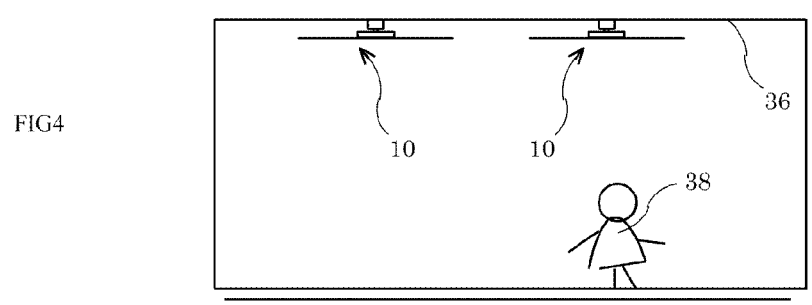
FIG. 4 is a side view of a plurality of rotating displays according to the third embodiment.

FIG. 4 and FIG. 5 are side views of an embodiment using a plurality of rotating displays (10). These embodiments are examples in which effective performance suitable for advertisements and the like can be performed while ensuring safety. In the example of FIG. 4, the plurality of rotating displays (10) are fixed so as to be hung on the ceiling (36). The person 38 can watch a moving image or a stereoscopic image formed by the cooperation of the plurality of rotating displays (10) while looking up at the ceiling (36). As a result, a very effective expression becomes possible, such as a moving image or a three-dimensional image moving around the ceiling (36) or a plurality of three-dimensional images moving in cooperation.

Figure 5A:
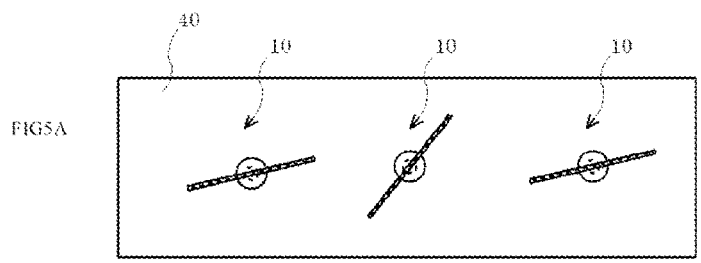
FIG. 5A is a front view of an example in which a plurality of rotating displays are arranged and fixed on a wall.
Figure 5B:
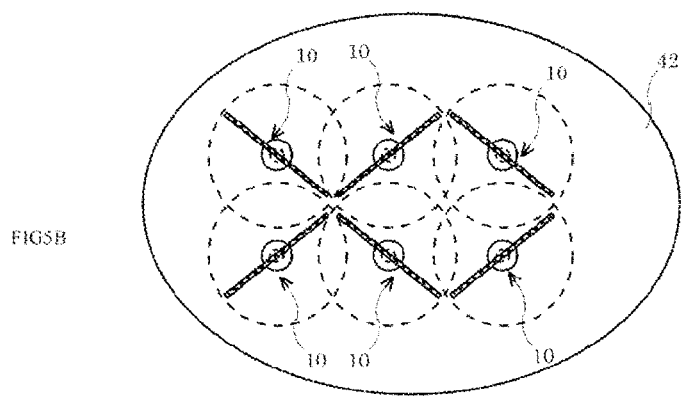
FIG. 5B is a front view showing an example in which they are arranged on an elliptical panel.
Figure 5C:
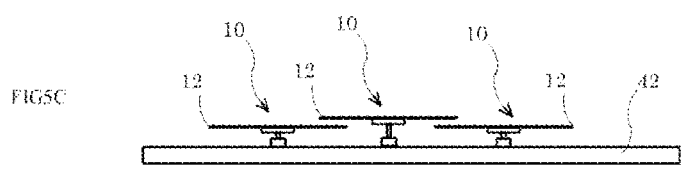
FIG. 5C shows the positions in the height direction of the rotation axes of the three plates 12 arranged side by side are different from each other.

FIG. 5A shows an example in which a plurality of rotating displays (10) are arranged and fixed on a wall (40). FIG. 5B has, for example, a plurality of rotating displays (10) arranged on an elliptical panel (42). The rotating display (10) can be arranged freely according to the required design. In the FIG. 5B, the six rotating displays (10) are arranged such that a part of a dashed circular image displayed by each of them overlaps with each other. For example, as shown in FIG. 5C, the positions in the height direction of the rotation axes of the three plates 12 arranged side by side are different from each other. Therefore, even if the three plates 12 rotate simultaneously, they do not collide with each other.

In this manner, the plurality of rotating displays (10) are arranged in a preset pattern, and the plurality of rotating displays (10) are arranged so that a part or all of the images displayed on each rotating display (10) overlap. Thus, an image with no noticeable discontinuity can be displayed vertically and horizontally. With such a structure, it is possible to produce an effect such that a moving image or a three-dimensional image changes while moving in a complicated manner. Actually, an effective advertisement display can be made by complexly combining images of people, animals, cars, and the like. Since there is no frame, the ceiling and wall patterns of the building can be used as background. The rotating displays of all other embodiments can also be arranged to overlap some or all of the images.

Embodiment 4

Figure 6:
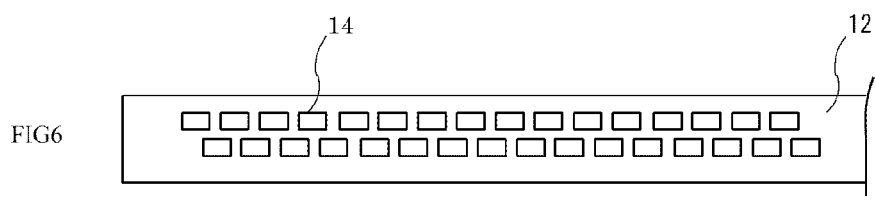
FIG. 6 is a partial plan view of the rotating display according to the fourth embodiment.

FIG. 6 is a plan view of a main part in which two rows of light emitting elements (14) are arranged on the plate (12).

One square in this figure represents, for example, three LEDs emitting three primary colors integrated. When image data is supplied at a predetermined timing while rotating the light emitting elements (14) in one row, a color moving image or a three-dimensional image can be displayed by an afterimage effect. This is as described above.

When the plate (12) is rotating to display an image, the displayed image may include an annular black streak. When the displayed image is photographed, the lines are clearly visible. The black streaks are caused by the locus of the gap between the adjacent light emitting elements (14). Therefore, in this embodiment, the light emitting elements (14) has a two-row configuration. When the arrangement of the two light-emitting element arrays arranged in parallel is shifted from each other in the longitudinal direction, black streaks can be prevented.

Embodiment 5

Figure 7A:
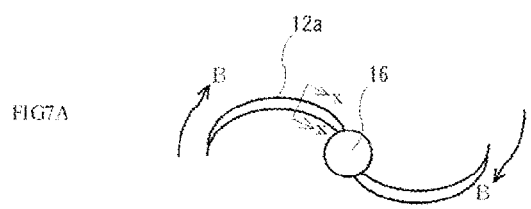
FIG. 7A is a cross-sectional view of a plate of the rotating display according to the fifth embodiment.
Figure 7B:
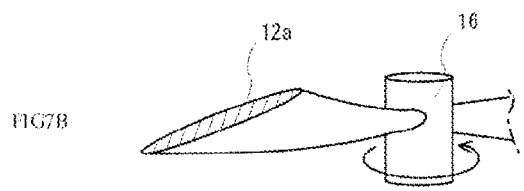
FIG. 7B is a plan view of the plate.

FIG. 7A is a plan view of the plate (12), and FIG. 7B is a cross-sectional view of the plate (12) taken along line XX.

This embodiment is a structure for suppressing noise when the plate (12a) rotates.

For example, FIG. 7A shows a structure for preventing vibration generated when the plate (12a) rotates. The shape of the plate (12a) shown in the plan view was entirely S-shaped. The plate (12a) is rotated in the direction of arrow B. Thus, the flow (a) of the wind hitting the plate (12a) can be adjusted to prevent unauthorized vibration and reduce noise.

As shown in FIG. 7B, the cross section of the plate (12) may be streamlined. The light emitting elements (14) mounted on the plate (12) is protected by molding with resin, and the entire cross section is arranged in a streamlined manner. Thereby, the noise generated when rotating can be attenuated. In this embodiment, the plate (12) has a sectional structure like a propeller of an airplane. Thus, when the plate (12) rotates, a wind heading toward the front or back of the display can be generated. The plate (12) also functions as a circulator. The plate (12) can be used for the production of shaking the ribbon and showing the flow of steam. Such a sectional structure can also be applied to all other embodiments.

Figure 8:
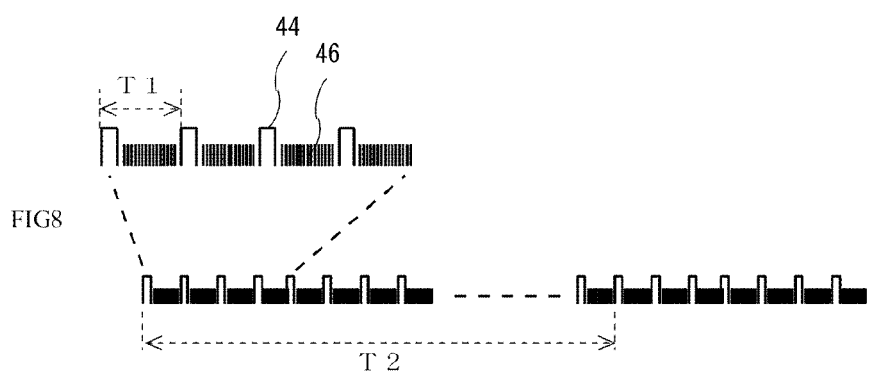
FIG. 8 is an explanatory diagram showing an example of a method of driving a rotating display.

FIG. 8 is an explanatory diagram showing an example of a drive signal for driving the rotating display of each of the above embodiments.

This figure shows the timing of the driving pulse supplied to the driving device (18) when the driving device (18) is a pulse motor. The image data (46) is a light emission control signal supplied to the light emitting elements (14) of the plate (12). The horizontal axis is time. When a color image is displayed, digital signals of three colors are used. In this example, the supply timing of single-color image data is shown.

For example, each time a pulse is supplied to the pulse motor, the drive shaft of the driving device (18) (FIG. 2) rotates by $\pi/60$ radians. At the timing of this one pulse supply, image data is supplied to all the light emitting elements (14) on the plate (12) to display an image of one line (line corresponding to the diameter of a circle). When the drive shaft (50) rotates by $\pi$ radians (ie, a half of a circle), image data (46) for 60 lines is supplied. In the apparatus shown in FIG. 2, the afterimage of one screen is displayed.

To reproduce a moving image of 30 screens per minute, when the reproduction time of one screen is T2, T2 is set to 1/30 second. The drive shaft is rotated 30 times per minute. A cycle T1 for supplying the drive pulse (44) to the pulse motor is T2/60 seconds. These are merely examples. The signal processing method can be freely changed according to the performance of the light emitting elements (14) and the driving device (18) and the required afterimage effect. Thus, a display device using the afterimage effect is completed.

Embodiment 6

Figures 9A, 9B:
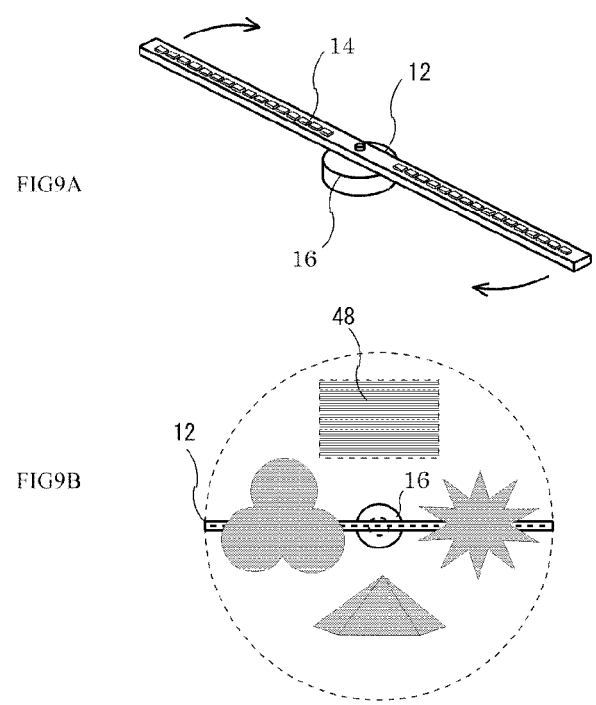
FIG. 9A is a front view showing an example of an image to be displayed.
FIG. 9B shows a plurality of images displayed separately and independently in a circular area.

FIG. 9A is a perspective view of the device described in the first embodiment and the like. Another control example of this device will be described. That is, by using the rotating display having the basic structure, control for supplying an image signal different from that of the above-described embodiment into a circular area is performed. That is, as in the example of FIG. 9B, control can be performed such that a plurality of images are displayed separately and independently in a circular area. As a result, it is possible to strongly exert the effect that the image appears to be floating in the air.

Embodiment 7

FIG. 10 is still another modification of the device of the present invention. FIG. 10A has a plurality of plates 12 arranged in an umbrella shape around a rotating drive shaft (50) so that a conical image can be displayed. It is possible to enjoy a screen with a more three-dimensional effect than the device shown in FIG 1. Moreover, when the rotating drive shaft (50) is set up perpendicular to the floor, the display image can be viewed from anywhere around the drive shaft (50).

Figure 10A:
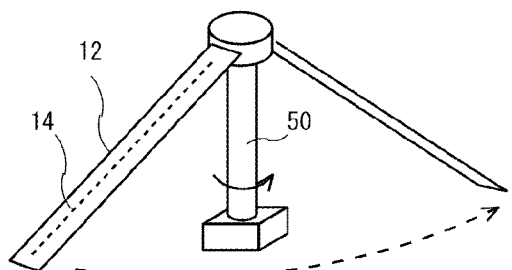
FIG. 10A is a perspective view of a rotating display according to a seventh embodiment.
Figure 10B:
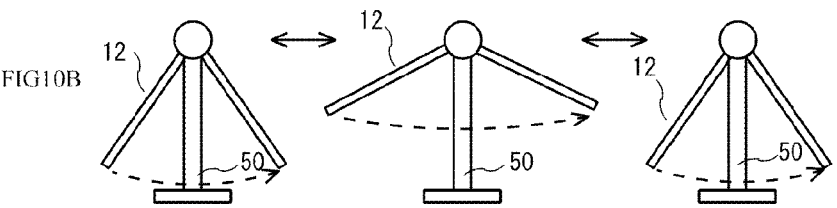
FIG. 10B to FIG. 10D are an explanatory diagram of the operation of it.
Figure 10C:
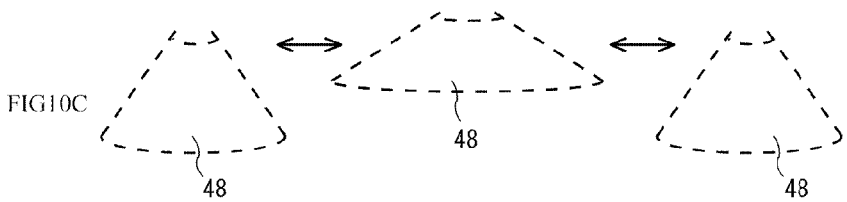
Figure 10D:
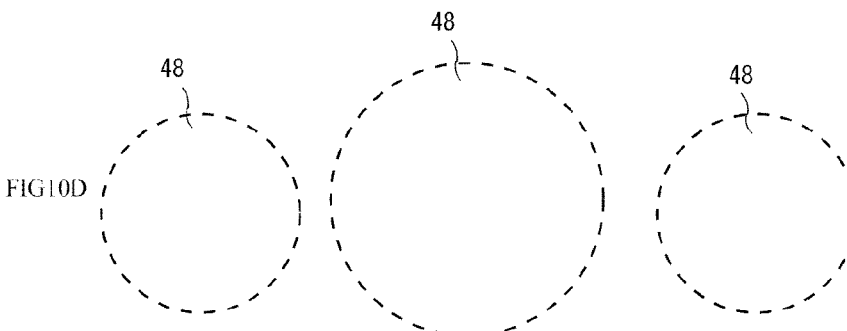

Further, as shown in FIG. 10B, when the rotation speed of the drive shaft (50) increases and the plate (12) deforms so as to spread the umbrella, the shape of the image also changes. FIG. 10C shows a change when viewed from the side, and FIG. 10D shows a change when the state of FIG. 10B is viewed from the top. Such a change has the effect of increasing the advertising effectiveness.

Embodiment 8

Figure 11A:
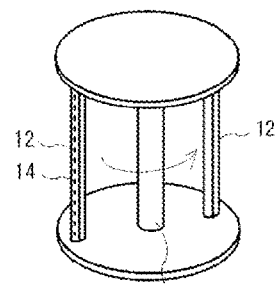
FIGS. 11A to 11C are perspective views of a rotating display according to the eighth embodiment.

FIG. 11A shows an example in which one or more plates 12 are arranged in parallel with the drive shaft (50). In the case of this example, a rectangular image with an afterimage is displayed in front of the drive shaft (50). At this time, if the drive shaft (50) is transparent, or if the drive shaft (50) is provided with a pattern or coloring that is indistinguishable from the background, the drive shaft (50) is inconspicuous and the image appears to rise. Further, similarly to the seventh embodiment, when the rotating drive shaft (50) is set upright to the floor, the display image can be viewed from anywhere around the drive shaft (50).

Figure 11B:
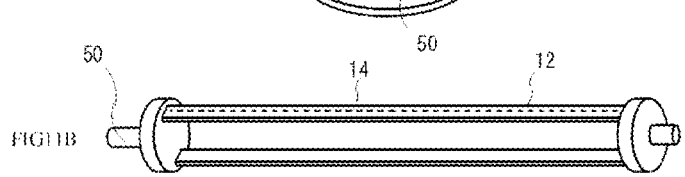
Figure 11C:
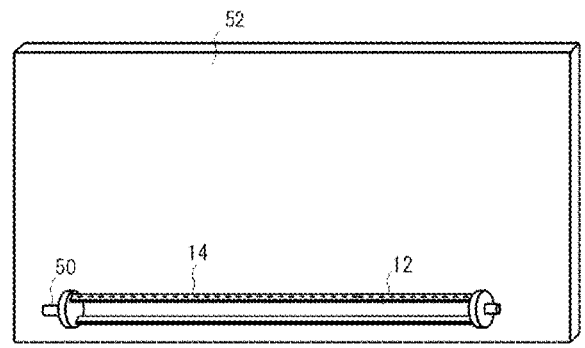
Figure 11D:
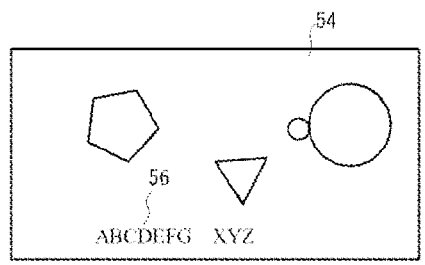
FIG. 11D is an explanatory diagram of the operation of it.

FIG. 11B shows an example in which the rotating drive shaft (50) is arranged parallel to the floor. In this case, the turning radius of the plate (12) is small. Thus, a band-like image such as a character string can be displayed in the horizontal direction. When the display (shown in FIG. 11B) is arranged so as to overlap the entire surface of the flat display (52) (shown in FIG. 11C), the images combined as in the example shown in FIG. 11D.

As a result, for example, while showing a movie using the flat display (52), the subtitles can be displayed on the display shown in FIG. 11B, or an advertisement can be displayed. There is no need to preliminarily perform image combining processing of image data and subtitles to be displayed on the flat display (52). There is an effect that two types of images can be freely selected and displayed in an overlapping manner. Moreover, the image behind the subtitles can be seen through. Even if images are combined, a natural image can be displayed because no border is visible.

Embodiment 9

For example, in a publicity or attraction or other event, the above rotating display functions extremely effectively. Depending on the place of use and the environment, various types of rotating displays described in the above embodiments can be used.

Various types of images based on the afterimage effect are used depending on the purpose, time, and display location.

Therefore, there is a need for a system capable of displaying the image data desired by the user in a timely and freely switching manner at any time. There is a limit to the system in which each user owns a computer build in for each rotating display and operates independently.

FIG. 12 is a block diagram of a management system using the Internet. The cloud server (58) shown in this figure is provided to operate this system. In the cloud server (58), the storage device (59) stores image data (66) and user data (68).

In order to utilize these data, the cloud server (58) incorporates a user interface (70), a display controller (72), and an accounting control unit (74)

The image data (66) includes a large number of various types of image data. Using this image data, an image desired by the user can be displayed on a rotating display having various structures. The user data (68) is data for identifying a user or identifying a rotating display used by the user.

The user interface (70) includes an operation screen for selecting an image desired by the user, an operation screen for adding a message desired by the user to the image data, and the like. The display controller (72) performs control for transmitting image data at a predetermined timing to various rotating displays connected to the cloud server (58) via the network (60).

For example, the user connects a user terminal device (64) such as a smartphone to the cloud server (58) via the network (60). Then, using the user terminal device (64), an operation of selecting image data desired to be displayed and an operation of inputting a display timing of an image are performed.

The accounting control unit (74) has a function of charging the user according to the amount of data used, for example, when the user selects a display image or requests transmission of the image data.

Further, in the example of this drawing, designer terminal devices (62) and (63) are connected to the cloud server (58) via the network (60). The designer terminal devices (62) and (63) are terminal devices operated by a designer who creates an image data.

Each designer can create his own image data, include it in the image data (66) of the cloud server (58), and upload it for use. When the user uses the image data, a usage fee is paid to the designer. For example, each time the image data is used once, a usage fee for one use is paid. The calculation of the usage fee is performed by the accounting control unit (74).

In the example of this drawing, the cloud server (58) transmits image data desired by the user via the network (60) to the five types of rotating displays having different structures. In this drawing, the rotating display indicated as M9A is the rotating display described using FIG. 9A. Similarly, each rotating display is given the drawing number used in the description.

FIG. 13 shows a specific example of the user data (68) and the image data (66). The user data (68) includes an operation screen for displaying a user code (76), a password (78) and a display list (80) as shown in this drawing.

The display list (80) includes a display code (82), an image data content code (84), a time schedule (86) and an address (88). If this system is operated on a membership system, the user code (76) is a member number. The password (78) is a password used when the user logs in to the server.

The display code (82) is a unique product number or identification number for each rotating display. The type of the rotating display is specified by the display code (82). The content code (84) is an identification number for specifying image data selected by the user to be displayed on the rotating display.

The time schedule (86) is data indicating a temporal timing for displaying an image selected by the user on the rotating display. This content can be freely set and changed by the user. The same image data can be displayed at regular time intervals, or different image data can be displayed alternately. The address (88) is an IP address or the like of the rotating display. This address is data necessary when the server transmits image data to the rotating display.

On the content display screen (91) shown in FIG. 13, various types of image data (66) are arranged side by side. This screen is displayed on the user's terminal device. The user selects any image data using the terminal device. The selected image data is registered in the display list (80) of the user data (68). Customized image data 92 displayed as "USER" in the content display screen (91) is image data to which a user can write arbitrary characters. It is preferable that the image data 92 include an image mainly composed of characters so that the user can write a daily catchphrase such as "this day's main product is . . . ".

If these image data are stored in the storage device (59) of the cloud server (58), the image data is automatically transmitted to the user's rotating display under the control of the cloud server (58), and the image data is stored on the rotating display according to the specified schedule. Is displayed. Further, the user can freely change the content code (84) and the time schedule (86) included in the user data (68) at any time to display the most effective advertisement screen.

REFERENCE SIGNS LIST

10 rotating display
12 plate
12*a* plate
12*b* plate
14 light emitting elements
16 board
18 driving device
20 display control unit
22 communication control unit
24 image data buffer
26 protective cover
28 human sensor
30 alarm
31 power supply
32 switch
34 glass window
36 ceiling
38 person
40 wall
42 panel
44 drive pulse
46 image data
48 display image
50 drive shaft
52 flat display
58 Cloud server
59 storage device
60 internet network
61 image data contents
62 designer terminal device
63 designer terminal device
64 user terminal
66 image data
68 user data
70 user interface
72 display controller
74 accounting control unit
76 user code
78 password
80 display list
82 display code
84 image data contents code
86 time schedule
88 address
91 Content display screen
92 Customized image data

The invention claimed is:

1. A control system for controlling rotating displays that display an image data by a rotating plate, on which light emitting elements arranged in a line comprising:
   a server connects with a plurality of rotating displays via a network;
   the server stores image data in a storage device and transmits the image data to the rotating displays;
   the storage device stores user data including a type of each rotating display held by the user and a time schedule for displaying the image data for the user;
   the server supplies to the terminal device an operation screen for user interface, that allows the user to select the image data that can be displayed according to the type of the rotating display held by the user, or allows the user to create displayable image data, or allows the user to input a time schedule for displaying the image data;
   the server has a display controller that transmits to the rotating displays the image data that is selected or created by the user and transmits the data indicating the time schedule;
   a data buffer that stores the image data for forming an image with an afterimage during rotation of the light-emitting elements;
   an image controller that supplies the image data to the light-emitting elements;
   the plurality of rotating displays is arranged in an overlapping pattern;
   the plurality of rotating displays are arranged and configured so that some or all the images displayed overlap on the rotating displays; and
   first and second rows of the light-emitting elements are arranged on the plate and viewed from a direction intersecting the first and second rows a second light-emitting element in the second row can be seen between a first light-emitting element in the first row.

2. The control system according to the claim 1, wherein the server is connected to the terminal device held by a designer via the network, the designed image data transmitted from the terminal device held by the designer is stored in the storage device of the server, and an accounting control unit is provided that adds a reward to the designer when the user selected the designed image data.

3. The control system according to the claim 1, wherein one or more plates are arranged parallel to the drive shaft of the driving device and each plate rotates around the drive shaft.

4. The control system according to the claim 1, wherein one or more plates are arranged like an umbrella bone around a driving shaft of the driving device.

5. The control system according to the claim 1, wherein the plate is transparent.

6. The control system according to the claim 1, wherein a rotating shaft of the motor of the driving device is passed through the transparent board, and the motor is arranged on one side of the transparent board and the plate is arranged on the other side with the light emitting elements facing the motor side.

7. The control system according to the claim 1, wherein the rotating plate of the rotating display is surrounded with a transparent hemispherical protective cover.

8. The control system according to the claim 1, wherein the driving device has no protective cover, has a human sensor that detects when a person approaches, and an alarm that emits an alarm sound by this detection or a switch that shuts off the power supply of the driving device.

9. The control system according to the claim 1, wherein the cross section of the plate is streamlined, or the plan view of the plate is S-shape, and the plate is connected to the rotation axis as axisymmetric.

10. A control system for controlling rotating displays that display an image data by a rotating plate, on which light emitting elements arranged in a line comprising:
- a server connects with a plurality of rotating displays via a network;
- the server stores image data in a storage device and transmits the image data to the rotating displays;
- the storage device stores user data including a type of each rotating display held by the user and a time schedule for displaying the image data for the user;
- the server supplies to the terminal device an operation screen for user interface, that allows the user to select the image data that can be displayed according to the type of the rotating display held by the user, or allows the user to create displayable image data, or allows the user to input a time schedule for displaying the image data;
- the server has a display controller that transmits to the rotating displays the image data that is selected or created by the user and transmits the data indicating the time schedule;
- a data buffer that stores the image data for forming an image with an afterimage during rotation of the light-emitting elements;
- an image controller that supplies the image data to the light-emitting elements; and
- first and second rows of the light-emitting elements are arranged on the plate and viewed from a direction intersecting the first and second rows a second light-emitting element in the second row can be seen between a first light-emitting element in the first row.

11. The control system according to the claim 10, wherein the server is connected to the terminal device held by a designer via the network, the designed image data transmitted from the terminal device held by the designer is stored in the storage device of the server, and an accounting control unit is provided that adds a reward to the designer when the user selected the designed image data.

12. The control system according to the claim 10, wherein one or more plates are arranged parallel to the drive shaft of the driving device and each plate rotates around the drive shaft.

13. The control system according to the claim 10, wherein one or more plates are arranged like an umbrella bone around a driving shaft of the driving device.

14. The control system according to the claim 10, wherein the plate is transparent.

15. The control system according to the claim 10, wherein a rotating shaft of the motor of the driving device is passed through the transparent board, and the motor is arranged on one side of the transparent board and the plate is arranged on the other side with the light emitting elements facing the motor side.

16. The control system according to the claim 10, wherein the rotating plate of the rotating display is surrounded with a transparent hemispherical protective cover.

17. The control system according to the claim 10, wherein the driving device has no protective cover, has a human sensor that detects when a person approaches, and an alarm that emits an alarm sound by this detection or a switch that shuts off the power supply of the driving device.

18. The control system according to the claim 10, wherein the cross section of the plate is streamlined, or the plan view of the plate is S-shape, and the plate is connected to the rotation axis as axisymmetric.

* * * * *